United States Patent [19]
Wittwer

[11] 3,935,612
[45] Feb. 3, 1976

[54] WINDSHIELD WIPER BLADE

[75] Inventor: Robert O. Wittwer, Portage, Ind.

[73] Assignee: The Anderson Company, Gary, Ind.

[22] Filed: Oct. 17, 1974

[21] Appl. No.: 515,637

[52] U.S. Cl. .......................................... 15/250.42
[51] Int. Cl.² .......................................... B60S 1/04
[58] Field of Search ............... 15/250.32–250.42; 403/157, 159

[56] References Cited
UNITED STATES PATENTS

| | | | |
|---|---|---|---|
| 2,649,605 | 8/1953 | Scinta et al. | 15/250.42 |
| 2,798,244 | 7/1957 | Nesson | 15/250.32 |
| 2,866,219 | 12/1958 | Scinta | 15/250.42 |
| 3,179,969 | 4/1965 | Glynn | 15/250.32 |
| 3,405,421 | 10/1968 | Tomlin | 15/250.42 |
| 3,416,180 | 12/1968 | Devtscher et al. | 15/250.32 |

FOREIGN PATENTS OR APPLICATIONS

| | | | |
|---|---|---|---|
| 1,089,210 | 11/1967 | United Kingdom | 15/250.42 |
| 1,183,446 | 3/1970 | United Kingdom | 15/250.42 |

Primary Examiner—Peter Feldman
Attorney, Agent, or Firm—Wegner, Stellman, McCord, Wiles & Wood

[57] ABSTRACT

A wiper blade is provided with a silent connection between two of the articulated parts thereof. The one part may be made of metal and has an inverted U-shape in cross section with flared lower edge portions at the outer connecting ends of said part. Aligned openings are formed in the side walls of the connecting ends of the metal part with said openings being in vertical alignment with said flared edge portions. A plastic part is pivotally attached to said metal part by means of a pair of aligned outwardly projecting lugs engaging in said openings in said first part. The top edges of the lugs are tapered outwardly. A vertical opening or slot is formed in said plastic part between said lugs to permit the lugs to deflect inwardly as the metal part is urged past the lugs and into articulating relationship when the lugs snap into said openings. An improved method of molding the secondary yokes using a two-piece mold and core pins is included that results in a less expensive but more efficient plastic part such as a secondary yoke.

6 Claims, 6 Drawing Figures

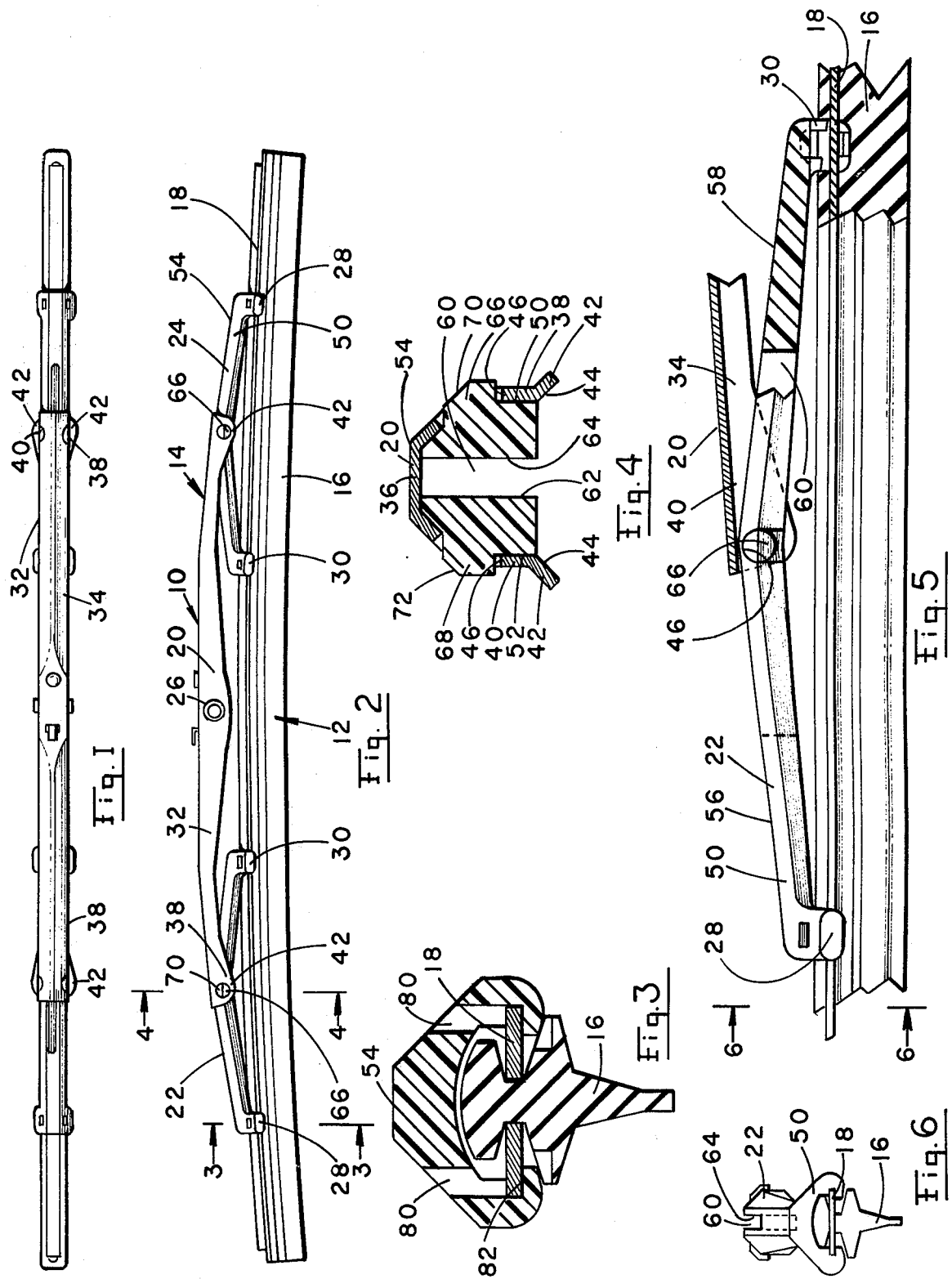

WINDSHIELD WIPER BLADE

BACKGROUND OF THE INVENTION

1. Field of the Invention

This invention relates to an improved windshield wiper blade assembly and, more particularly, to an improved connection between the primary yoke and the secondary yokes. The invention is also directed to an improved method for molding the secondary yokes using a two-part mold arrangement.

2. Description of the Prior Art

Since the introduction of articulated windshield wiper blades for wiping curved and flat windshields, first disclosed in the J. W. Anderson U.S. Pat. No. 2,596,063, many improvements have been made on various elements of the articulated structure with the view to improving upon the operation of the whole wiper blade assembly. The connections between the primary yokes and the secondary yokes, although functioning very adequately, have, on occasion, given some problems both in assembly and in making noise during use.

The most common form of connection between the primary and secondary yokes is a pin or rivet passing between the downturned legs of the inverted channel shaped primary yoke and between the side walls of the downturned U-shaped channel of the secondary yoke. This form of connection, after some considerable use of the blade, will begin to make noises, such as small clicking noises, whenever the direction of movement of the blade is reversed, i.e. from moving left to moving right or vice versa. Special bushing arrangements have been provided which reduce the extent of the problem but still over a period of time looseness and noise develops.

In another design of the articulated superstructure for a wiper blade, different forms of release mechanisms for the connection between the primary and secondary yoke have been provided. These mechanisms include springs, ears, actuator members and the like to make it possible to separate the primary yoke from the secondary yoke by depressing the actuator thereby releasing the spring and making it possible to move the primary yoke relative to the secondary yoke for disconnecting the primary yoke from the secondary yoke.

Still another popular form of connection between the primary yoke and secondary yoke has been to extend a pair of ears from the primary yoke downwardly beyond the lower edges of the inverted U-shaped channel of the secondary yoke with said ears being bent inwardly to nest in slots formed in the bottom edges of said secondary yokes. Once again, this construction is subject to wear and does create noise when the direction of movement of the blade is reversed as the blade traverses the surface of a windshield.

Also, heretofore, whenever a yoke has been molded, it generally required several die parts and die pins in order to mold the claws on the lower ends thereof. The dies being complicated, are subject to wear and must be constantly upgraded which increases the cost of the molding of the individual parts.

SUMMARY OF THE INVENTION

By providing the superstructure of a wiper blade with a metal primary yoke pivotally connected to plastic secondary yokes, a quieter and cheaper manufacturing design results. Since the metal yoke articulates on the plastic yoke, there is no likelihood of noise between the two as the direction of movement of the blade is reversed. The secondary yokes are made of plastic and are slidably connected to the metal or plastic backing strip of the wiper blade thereby creating a plastic-to-metal or a plastic-to-plastic connection which is not likely to make noise, no matter how much play there is between the parts.

The secondary yokes have molded, outwardly projecting lugs with downwardly and outwardly tapered upper surfaces against which is urged the downwardly directed arms of the inverted U-shaped channel member of the primary yoke. The lower edge portions of the primary yoke are flared outwardly so as to ride on the tapered upper surfaces of the lugs on the secondary yoke whereby forcing the primary yoke down onto the secondary yoke will cam the side walls of the primary yoke outwardly as the lugs and spaced walls of the secondary yoke are cammed inwardly until the lugs on the secondary yoke enter the aligned openings in the walls of the primary yoke whereby an improved, relatively inexpensive and quiet articulated connection is created.

The secondary yokes are molded with a relatively simple two-piece mold with pins passing down through the mold to form the guiding surface on the inside of the inwardly facing claws at each end of the secondary yoke. This is a much cheaper method of making the secondary yokes and is highly efficient and produces a highly functional structure.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a top view of a windshield wiper blade incorporating the features of my invention;

FIG. 2 is an elevational view of the windshield wiper blade of FIG. 1 showing my improved connection between the primary and secondary yoke and showing the secondary yokes made with the simple two-piece mold;

FIG. 3 is an enlarged cross-sectional view taken along the lines 3—3 of FIG. 2;

FIG. 4 is an enlarged cross-sectional view taken along the lines 4—4 of FIG. 2;

FIG. 5 is an enlarged elevational view of the connection between the primary and secondary yokes with parts in section and parts broken away; and FIG. 6 is an end view taken along the lines 6—6 of FIG. 5.

DESCRIPTION OF THE PREFERRED EMBODIMENT

Referring to the drawings, the windshield wiper assembly 10 is comprised of a wiper blade 12 and a pressure-distributing superstructure 14. The wiper blade 12 is comprised of a resilient rubber-like wiping element 16 connected with an elongate flexible backing strip or flexor 18. The flexor 18 is flexible in a plane perpendicular to a windshield and is substantially inflexible in a plane parallel to the windshield. The pressure-distributing superstructure 14 may be constructed in any one of a variety of ways but, as illustrated herein, preferably includes a primary yoke 20 having its ends pivotally connected with the intermediate portions of the secondary yokes 22 and 24 and has a connector 26 located intermediate the ends thereof. The blade assembly 10 is connected by connector 26 to a windshield wiper arm, not shown. The wiper arm, and with it the wiper blade, is moved back and forth across the surface of a windshield to be wiped. As illustrated, the secondary yokes 22 and 24 are slidably connected with the backing strip 18 of the wiper blade 12 with the outboard claws 28 of the secondary yokes spaced inward from the ends of the wiper blade. This is but one of many different constructions wherein the secondary yokes have claws 28,30 on the opposite ends thereof which claws are adapted to slidably engage with the flexor or backing strip 18 of the wiper blade with the outboard claws 28 engaging the flexor 18 either at or near the outer ends of the wiper blade or at points inboard therefrom.

The primary yoke 20 is shown made of metal or of a similar, substantially rigid material, and is channel shaped in cross section so as to resemble an inverted "U" having side walls 32,34 and a base wall 36. The outer end portions 38,40 of the walls 32,34 have depending portions that are bent, flared or tapered outwardly to provide guide members 42 having guide surfaces 44. Aligned with the guide members 42 and spaced centrally of the side walls 32,34 of each secondary yoke is a pair of aligned openings 46.

The secondary yokes 22 and 24 are molded plastic members and the method of molding said members will be discussed more in detail hereinafter. The secondary yokes 22 an 24 are molded or formed and have side walls 50,52 which are joined together by a V-shaped or crowned top wall 54. Each yoke has a pair of legs 56,58 joined at the center with leg 56 having a pair of claws 28 at its outer end portion and with leg 58 having a pair of claws 30 at its outer end portion. The midportion of each secondary yoke 22 and 24 has a vertical slot or open space 60 extending from the midportion of each leg of said yoke. The walls 62 and 64 of the slot 60 are spaced apart an amount sufficient to permit the two walls of the secondary yoke to be deflected inwardly to a limited extent. Spaced a short distance down from the top surface 54 of each secondary yoke and projecting outwardly from the side walls 50,52 of the midportion thereof is a pair of lugs 66,68 which are illustrated as circular in cross section with the top or upper edge formed or tapered at an angle downwardly with respect to the top cylindrical wall of said lug to form a guide or cam surface 70,72. The angle of the guide or cam surface 70,72 is substantially equal to the angle of the flared guide members 42 of the side walls 32,34 of the primary yoke 20.

To assemble the primary yoke 20 with one of the secondary yokes 22 or 24, end portions 38,40 of the primary yoke are substantially aligned with the lugs 66,68 on the midportion of the secondary yoke with the openings 46 somewhat aligned with said lugs 66,68. The guide surfaces 44 of the tapered guide members 42 are placed in contact with the tapered cam surfaces 70,72 on the lugs 66 and 68 so that downward pressure of the primary yoke relative to the secondary yoke will cam the side walls 32,34 of the end portions 38,40 of the primary yoke outward as the mid-portion of the secondary yoke is deflected inward to substantially close the opening 60 therebetween in the vicinity of the lugs 66 and 68. The side walls 32,34 of the primary yoke will ride over the lugs 66 and 68 until the lugs 66 and 68 align with and drop into the openings 46 in the side walls 32,34 of the end portions 38,40 of the primary yoke. The resilience of the plastic forces the lugs 66,68 outward so that a snug but easily maneuverable and pivotal connection between the primary yoke and the secondary yoke is accomplished. The pivotal connection between the end of the metal primary yoke 20 and each plastic secondary yoke 22,24 needs no lubrication and permits relatively free articulation between the two while at the same time adjusts automatically to any minor amounts of wear that may develop between the two. Since the bearing surfaces are relatively wide, the amount of wear is spread out over a large surface and is therefore minimal.

It is contemplated that, in the event it is desired to separate the primary yoke 20 from the secondary yokes 22,24, the slot 60 may be of such a dimension that the walls 50,52 at the midportion of the secondary yoke may be deflected to close the slot 60 so that the lugs 66 and 68 can be drawn out of the openings 46 thereby disconnecting the primary yoke from the secondary yokes.

An improved method of molding the secondary yokes has also been devised. That is, by the use of a simple two-piece mold, it is possible to mold the claws, the lugs and the slot cheaply and efficiently. The mold is parted along a generally horizontal plane of the yoke. The mating halves of the mold are brought together by a vertical movement whereupon core pins are dropped in from the top to form the slot 60 and to form the slots 80 (see FIG. 3). The pins to form the slots 80 are positioned in the mold to form the top surface 82 of each claw 28,30. Using a two-part mold with core pins as described, it is possible to mold each secondary yoke very inexpensively. Specifically, pins are brought down through the two halves of the die a controlled amount so as to provide the overhang for the inturned claws 28,30. An elongate center pin or plate is inserted to provide the slot 60 through the vertical center of the secondary yoke. After the plastic has been injected into the mold, the pins are retracted from the claw ends of the die and the center pin or plate is withdrawn from the central portion of the die whereupon the two halves of the die are separated and the secondary yoke is removed. The resulting secondary yoke has openings 80 aligned with the overhanging portion of the claws at the ends of the secondary yoke but there is sufficient material forming the support for the claws to provide an efficient and sturdy construction. Since the claws are of plastic and are adapted to slide on the outer edge portions of the flexor 18, there will be no noise between the claws and the flexor. The plastic-on-metal connection is quieter and more friction free than the metal-on-metal-type connection.

From the above, it is clear that an improved wiper assembly is provided that has a metal, or other substantially rigid, primary yoke and plastic, or the like, secondary yokes with a solid connection between the midportions of the secondary yoke and the end portions of the primary yoke which connection is substantially friction free and still affords a positive pivotal connection between the primary and secondary yokes. The primary yoke can be easily assembled with the secondary yoke by means of the tapered edges on the lugs and the tapered flared portions of the primary yoke to effect an efficient connection therebetween. The molding of the secondary yokes using a simple two-piece mold provides a cheaper and more efficient way of molding the plastic secondary yoke.

I claim:

1. In a wiper assembly having a wiper blade, a pressure-distributing superstructure operatively connected with said wiper blade, said superstructure having a primary yoke and at least one secondary yoke, said secondary yoke being pivotally connected to said primary yoke, a pair of spaced apart walls on the end portions of said primary yoke, a pair of outwardly flared lower edge portions on said end portions, a pair of aligned openings spaced vertically from said flared edge portions in said outer end portions, a midportion of said secondary yoke being split vertically and having outwardly projecting lugs formed on the outwardly facing walls of said midportion, the top edges of said lugs being tapered outwardly from a top edge of said midportion, said flared edge portions of said walls engage with the tapered top edges of said lugs such that relative pressure therebetween deflects the lugs and midportion of the secondary yoke into the opening created by said split therebetween and said side walls of said primary yoke are deflected outward until the lugs align with and pivotally seat in said openings in the side walls of said primary yoke.

2. In a wiper assembly having a wiper blade and a pressure-distributing superstructure operatively connected therewith, said superstructure having a metal primary yoke and at least one plastic secondary yoke, means for pivotally connecting said primary yoke to said secondary yoke, said means comprising a pair of spaced apart walls depending from at least one end portion of said primary yoke, a pair of aligned openings in said walls, a midportion of said secondary yoke having a vertical open space extending completely from top to bottom between a pair of spaced apart walls, outwardly projecting lugs formed on said spaced apart walls of said secondary yoke in alignment with said open space therebetween to permit said walls and said lugs to be moved toward each other, said lugs pivotally nesting in said openings in said primary yoke.

3. In a wiper assembly having a wiper blade and a pressure-distributing superstructure operatively connected therewith, said superstructure having a metal primary yoke and at least one plastic secondary yoke, means for pivotally connecting said primary yoke to said secondary yoke, said means comprising a pair of spaced apart walls on at least one end portion of said primary yoke, a pair of aligned openings in said end portion of said walls, a midportion of said secondary yoke having a vertical opening between a pair of spaced apart walls, outwardly projecting lugs formed on said spaced apart walls of said secondary yoke, said lugs pivotally nesting in said openings in said primary yoke, said lower edge portions of said walls of said primary yoke are flared outwardly, and said top edges of said lugs are tapered outwardly such that relative pressure between said primary yoke and secondary yoke will deflect the lugs and midportion of the secondary yoke into the vertical opening between the spaced walls of said secondary yoke and said side walls of said primary yoke are deflected outward until the lugs align with and pivotally seat in said openings in the side walls of said primary yoke.

4. A wiper assembly having a wiper blade, a pressure-distributing superstructure operatively connected with said wiper blade, said superstructure having at least two parts pivotally connected together, the first of said parts having end portions with spaced apart side walls, a pair of aligned openings in the side walls of said end portions, the second part having a midportion with a vertical open space extending from top to bottom between a pair of side walls thereof, a pair of outwardly projecting lugs formed on the said side walls of said midportion, said lugs pivotally seating in said openings in the first part.

5. A wiper assembly having a wiper blade, a pressure-distributing superstructure operatively connected with said wiper blade, said superstructure having at least two parts pivotally connected together, the first of said parts having end portions with spaced apart side walls, a pair of aligned openings in the side walls of said end portions, the second part having a midportion with a vertical open space between a pair of side walls thereof, a pair of lugs formed on the said side walls of said midportion, said lugs pivotally seating in said openings in the first part, said end portions of the first part have outwardly flared lower edge portions which flared portions are adopted during assembly to engage with said lugs on the second part such that relative pressure therebetween deflects the lugs and midportion of the second part into the vertical open space therebetween, and said side walls of said first part are deflected outward until the lugs align with and pivotally seat in said openings in the side walls of said first part.

6. A wiper assembly as claimed in claim 5 wherein the top edges of said lugs are outwardly tapered so that said flared edge portions of said first part will be cammed on said tapered surface as the first and second parts are assembled.

* * * * *